(12) United States Patent
Miyata et al.

(10) Patent No.: US 9,306,229 B2
(45) Date of Patent: Apr. 5, 2016

(54) FUEL CELL SYSTEM

(75) Inventors: Koichiro Miyata, Wako (JP); Chihiro Wake, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 787 days.

(21) Appl. No.: 13/564,718

(22) Filed: Aug. 2, 2012

(65) Prior Publication Data

US 2013/0034787 A1 Feb. 7, 2013

(30) Foreign Application Priority Data

Aug. 3, 2011 (JP) .................................. 2011-170572

(51) Int. Cl.
*H01M 8/04* (2006.01)

(52) U.S. Cl.
CPC ........ *H01M 8/0432* (2013.01); *H01M 8/04089* (2013.01); *H01M 8/04097* (2013.01); *H01M 8/04179* (2013.01); *H01M 8/04231* (2013.01); *H01M 8/04447* (2013.01); *H01M 8/04798* (2013.01); *Y02E 60/50* (2013.01)

(58) Field of Classification Search
CPC ............................................... H01M 8/04179
USPC ........................................................ 429/429
See application file for complete search history.

(56) References Cited

U.S. PATENT DOCUMENTS

2010/0055523 A1* 3/2010 Ogawa et al. .................... 429/25
2010/0143757 A1* 6/2010 Takagi et al. .................... 429/22

FOREIGN PATENT DOCUMENTS

JP 2007-123040 5/2007

* cited by examiner

*Primary Examiner* — Basia Ridley
*Assistant Examiner* — James Erwin
(74) *Attorney, Agent, or Firm* — Mori & Ward, LLP

(57) ABSTRACT

A fuel cell system includes a fuel cell, a fuel gas supply channel, a fuel off-gas discharge channel, an oxidant gas supply channel, an oxidant off-gas discharge channel, a first shut valve, a second shut valve, a shut valve controller, a temperature detector, a scavenging device, and an elapsed-time detector. The elapsed-time detector is configured to detect an elapsed time elapsed from a timing at which the fuel cell is shut down. The scavenging device scavenges the oxidant gas flow channel and the fuel gas flow channel in sequence if the elapsed time detected by the elapsed-time detector is within a first predetermined period of time. The scavenging device scavenges the fuel gas flow channel and the oxidant gas flow channel in sequence if the elapsed time detected by the elapsed-time detector is outside the first predetermined period of time.

8 Claims, 7 Drawing Sheets

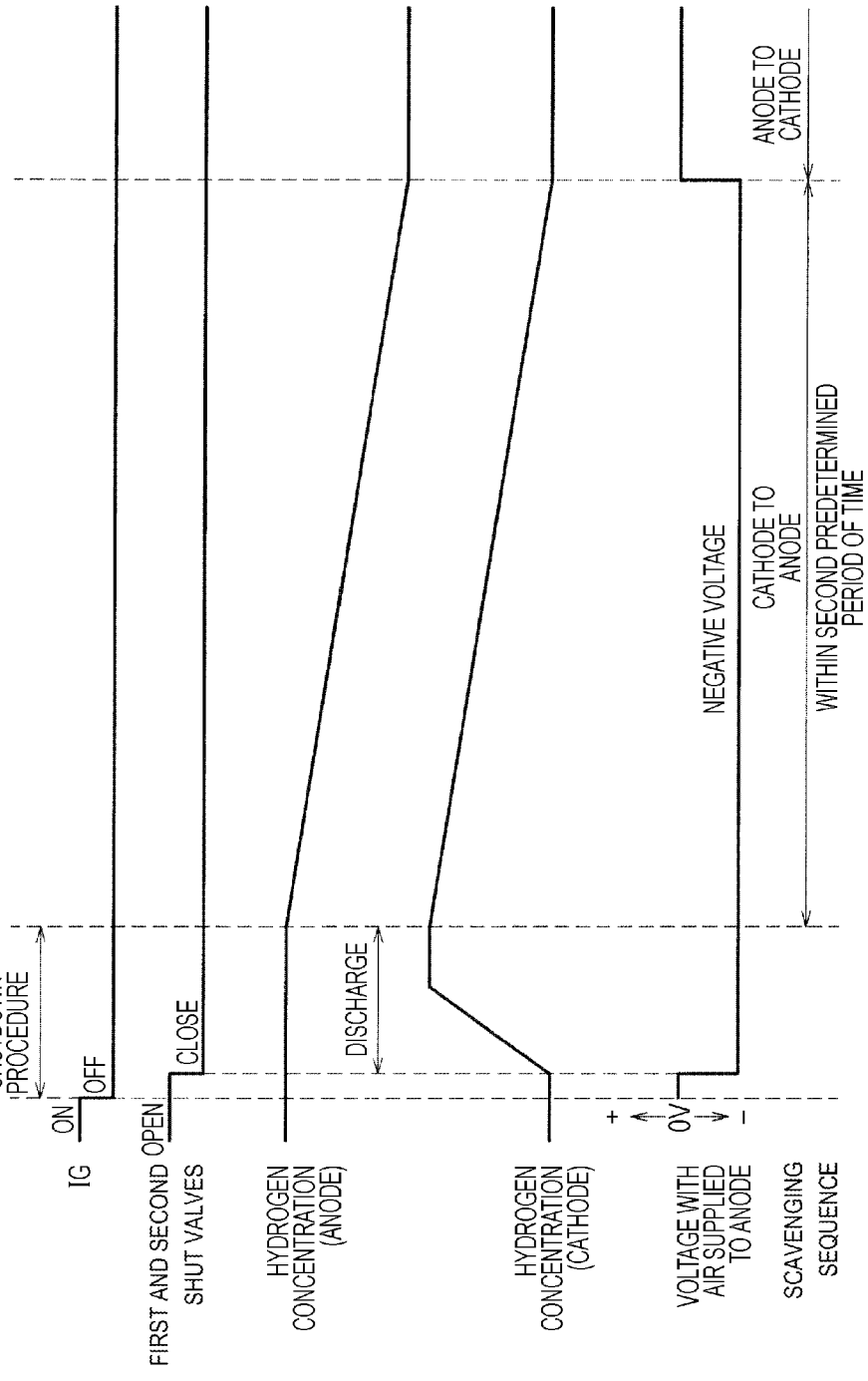

FUEL CELL SYSTEM

CROSS-REFERENCE TO RELATED APPLICATIONS

The present application claims priority under 35 U.S.C. §119 to Japanese Patent Application No. 2011-170572, filed Aug. 3, 2011, entitled "Fuel Cell System." The contents of this application are incorporated herein by reference in their entirety.

BACKGROUND OF THE INVENTION

1. Field of the Invention

The present application relates to a fuel cell system.

2. Discussion of the Background

Recently, efforts have been directed to the development of fuel cells, which generate electricity as they are supplied with hydrogen (fuel gas) and air containing oxygen (oxidant gas). Fuel cells are a promising power source for applications such as fuel cell vehicles (mobile units).

A fuel cell produces water (water vapor) at its cathode during operation. In addition, for example, air flowing toward the cathode is humidified by a humidifier to maintain adequate moisture in an electrolyte membrane (solid polymer membrane) of a membrane electrode assembly (MEA) forming the fuel cell. Accordingly, water (water vapor, condensed water) remains in the fuel cell immediately after shutdown. Such water may freeze in the fuel cell at low temperatures (e.g., 0° C. or lower) after shutdown.

One proposed technique is to scavenge water from the fuel cell with a scavenge gas such as air if the fuel cell possibly freezes at low temperatures (see Japanese Unexamined Patent Application Publication No. 2007-123040).

SUMMARY OF THE INVENTION

According to one aspect of the present invention, a fuel cell system includes a fuel cell, a fuel gas supply channel, a fuel off-gas discharge channel, an oxidant gas supply channel, an oxidant off-gas discharge channel, a first shut valve, a second shut valve, a shut valve controller, a temperature detector, a scavenging device, and an elapsed-time detector. The fuel cell has a fuel gas flow channel and an oxidant gas flow channel. The fuel cell is to generate electricity as a fuel gas is supplied to the fuel gas flow channel and an oxidant gas is supplied to the oxidant gas flow channel. The fuel gas flows toward the fuel gas flow channel through the fuel gas supply channel. A fuel off-gas discharged from the fuel gas flow channel flows through the fuel off-gas discharge channel. The oxidant gas flows toward the oxidant gas flow channel through the oxidant gas supply channel. An oxidant off-gas discharged from the oxidant gas flow channel flows through the oxidant off-gas discharge channel. The first shut valve is disposed in the oxidant gas supply channel. The second shut valve is disposed in the oxidant off-gas discharge channel. The shut valve controller is configured to control the first shut valve and the second shut valve. The shut valve controller closes the first shut valve and the second shut valve to seal off the oxidant gas flow channel when the fuel cell is shut down. The temperature detector is configured to detect a temperature of the fuel cell. The scavenging device is to scavenge the fuel gas flow channel and the oxidant gas flow channel with a scavenge gas if the temperature of the fuel cell detected by the temperature detector is equal to or lower than a predetermined temperature after the fuel cell is shut down. The elapsed-time detector is configured to detect an elapsed time elapsed from a timing at which the fuel cell is shut down. The scavenging device scavenges the oxidant gas flow channel and the fuel gas flow channel in sequence if the elapsed time detected by the elapsed-time detector is within a first predetermined period of time during which the fuel gas is to remain in the oxidant gas flow channel. The scavenging device scavenges the fuel gas flow channel and the oxidant gas flow channel in sequence if the elapsed time detected by the elapsed-time detector is outside the first predetermined period of time.

According to another aspect of the present invention, a fuel cell system includes a fuel cell, a fuel gas supply channel, a fuel off-gas discharge channel, an oxidant gas supply, an oxidant off-gas discharge channel, a first shut valve, a second shut valve, a shut valve controller, a temperature detector, a scavenging device, and a fuel-gas-concentration detector. The fuel cell has a fuel gas flow channel and an oxidant gas flow channel. The fuel cell is to generate electricity as a fuel gas is supplied to the fuel gas flow channel and an oxidant gas is supplied to the oxidant gas flow channel. The fuel gas flows toward the fuel gas flow channel through the fuel gas supply channel. A fuel off-gas discharged from the fuel gas flow channel flows through the fuel off-gas discharge channel. The oxidant gas flows toward the oxidant gas flow channel through an oxidant gas supply channel. An oxidant off-gas discharged from the oxidant gas flow channel flows through the oxidant off-gas discharge channel. The first shut valve is disposed in the oxidant gas supply channel. The second shut valve is disposed in the oxidant off-gas discharge channel. The shut valve controller is configured to control the first shut valve and the second shut valve. The shut valve controller closes the first shut valve and the second shut valve to seal off the oxidant gas flow channel when the fuel cell is shut down. The temperature detector is configured to detect a temperature of the fuel cell. The scavenging device is to scavenge the fuel gas flow channel and the oxidant gas flow channel with a scavenge gas if the temperature of the fuel cell detected by the temperature detector is equal to or lower than a predetermined temperature after the fuel cell is shut down. The fuel-gas-concentration detector is configured to detect a fuel gas concentration in the oxidant gas flow channel. The scavenging device scavenges the oxidant gas flow channel and the fuel gas flow channel in sequence if the fuel gas concentration detected by the fuel-gas-concentration detector is higher than a predetermined fuel gas concentration. The scavenging device scavenges the fuel gas flow channel and the oxidant gas flow channel in sequence if the fuel gas concentration detected by the fuel-gas-concentration detector is equal to or lower than the predetermined fuel gas concentration.

According to further aspect of the present invention, a fuel cell system includes a fuel cell, a fuel gas supply channel, a fuel off-gas discharge channel, an oxidant gas supply channel, an oxidant off-gas discharge channel, a first shut valve, a second shut valve, a shut valve controller, a temperature detector, a scavenging device, a fuel-gas-concentration increasing device, and an elapsed-time detector. The fuel cell has a fuel gas flow channel and an oxidant gas flow channel. The fuel cell is to generate electricity as a fuel gas is supplied to the fuel gas flow channel and an oxidant gas is supplied to the oxidant gas flow channel. The fuel gas flows toward the fuel gas flow channel through the fuel gas supply channel. A fuel off-gas discharged from the fuel gas flow channel flows through the fuel off-gas discharge channel. The oxidant gas flows toward the oxidant gas flow channel through the oxidant gas supply channel. An oxidant off-gas discharged from the oxidant gas flow channel flows through the oxidant off-gas discharge channel. The first shut valve is disposed in the oxidant gas supply channel. The second shut valve is disposed in the oxidant off-gas discharge channel. The shut valve controller is configured to control the first shut valve and the second shut valve. The shut valve controller closes the first shut valve and the second shut valve to seal off the oxidant gas flow channel when the fuel cell is shut down. The temperature detector is configured to detect a temperature of the fuel cell. The scavenging device is to scavenge the fuel gas flow channel and the oxidant gas flow channel with a scavenge gas if the temperature of the fuel cell detected by the temperature detector is equal to or lower than a predetermined temperature after the fuel cell is shut down. The fuel-gas-concentration increasing device is to increase a fuel gas concentration in the oxidant gas flow channel. The fuel-gas-concentration increasing device increases the fuel gas concentration in the oxidant gas flow channel when the fuel cell is shut down. The elapsed-time detector is configured to detect an elapsed time elapsed from a timing at which the fuel cell is shut down. The scavenging device scavenges the oxidant gas flow channel and the fuel gas flow channel in sequence if the elapsed time detected by the elapsed-time detector is within a second predetermined period of time during which the fuel gas is to remain in the oxidant gas flow channel. The scavenging device scavenges the fuel gas flow channel and the oxidant gas flow channel in sequence if the elapsed time detected by the elapsed-time detector is outside the second predetermined period of time.

According to the other aspect of the present invention, a fuel cell system includes a fuel cell, a fuel gas supply channel, a fuel off-gas discharge channel, an oxidant gas supply channel, an oxidant off-gas discharge channel, a first shut valve, a second shut valve, a shut valve controller, a temperature detector, a scavenging device, a fuel-gas-concentration increasing device, and a fuel-gas-concentration detector. The fuel cell has a fuel gas flow channel and an oxidant gas flow channel. The fuel cell is to generate electricity as a fuel gas is supplied to the fuel gas flow channel and an oxidant gas is supplied to the oxidant gas flow channel. The fuel gas flows toward the fuel gas flow channel through the fuel gas supply channel. A fuel off-gas discharged from the fuel gas flow channel flows through the fuel off-gas discharge channel. The oxidant gas flows toward the oxidant gas flow channel through the oxidant gas supply channel. An oxidant off-gas discharged from the oxidant gas flow channel flows through the oxidant off-gas discharge channel. The first shut valve is disposed in the oxidant gas supply channel. The second shut valve is disposed in the oxidant off-gas discharge channel. The shut valve controller is configured to control the first shut valve and the second shut valve. The shut valve controller closes the first shut valve and the second shut valve to seal off the oxidant gas flow channel when the fuel cell is shut down. The temperature detector is configured to detect a temperature of the fuel cell. The scavenging device is to scavenge the fuel gas flow channel and the oxidant gas flow channel with a scavenge gas if the temperature of the fuel cell detected by the temperature detector is equal to or lower than a predetermined temperature after the fuel cell is shut down. The fuel-gas-concentration increasing device is to increase a fuel gas concentration in the oxidant gas flow channel. The fuel-gas-concentration increasing device increases the fuel gas concentration in the oxidant gas flow channel when the fuel cell is shut down. The fuel-gas-concentration detector is configured to detect the fuel gas concentration in the oxidant gas flow channel. The scavenging device scavenges the oxidant gas flow channel and the fuel gas flow channel in sequence if the fuel gas concentration detected by the fuel-gas-concentration detector is higher than a predetermined fuel gas concentration. The scavenging device scavenges the fuel gas flow channel and the oxidant gas flow channel in sequence if the fuel gas concentration detected by the fuel-gas-concentration detector is equal to or lower than the predetermined fuel gas concentration.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 is a timing chart illustrating an example of the operation of the fuel cell system according to the second embodiment.

DESCRIPTION OF THE EMBODIMENTS

Figure 1:
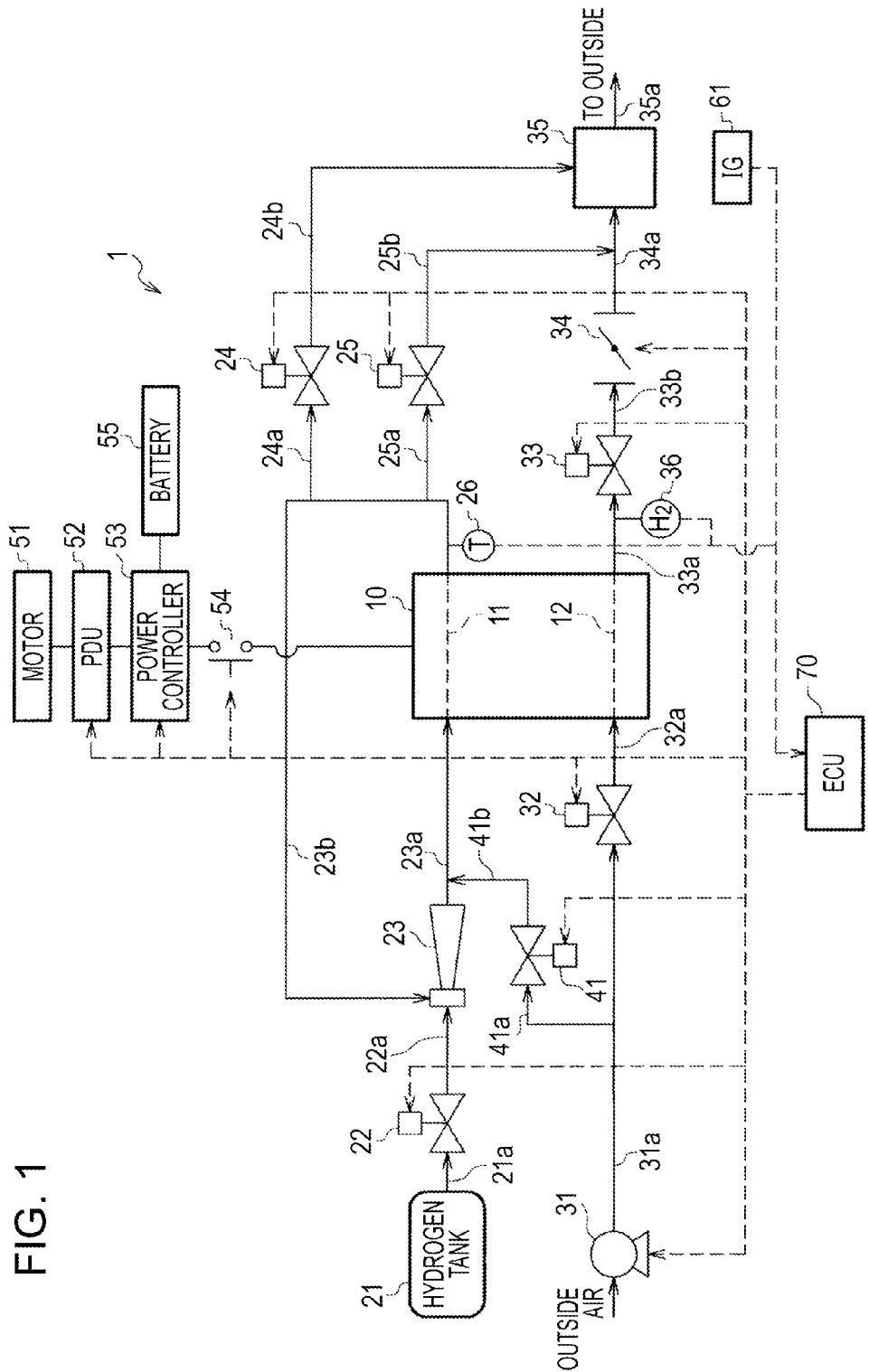
FIG. 1 is a schematic diagram of a fuel cell system according to a first embodiment.

The embodiments will now be described with reference to the accompanying drawings, wherein like reference numerals designate corresponding or identical elements throughout the various drawings.

First Embodiment

A first embodiment will now be described with reference to FIGS. 1 to 5.

It should be noted that although a first shut valve 32 and a second shut valve 33 are shown closed after soaking is started (during system standby) in FIGS. 4 and 5, they are opened as needed when a fuel cell stack 10 is scavenged, which also applies to FIG. 7, described later.

Configuration of Fuel Cell System

Referring to FIG. 1, a fuel cell system 1 according to the first embodiment is mounted on a fuel cell vehicle (mobile unit) (not shown). The fuel cell system 1 includes a fuel cell stack 10, an anode section that supplies and discharges hydrogen (fuel gas, reactant gas) to and from the anode of the fuel cell stack 10, a cathode section that supplies and discharges air containing oxygen (oxidant gas, reactant gas) to and from the cathode of the fuel cell stack 10, a scavenge-gas introducing section that introduces a scavenge gas into the anode section to scavenge the fuel cell stack 10, a power control section that controls the operation of the fuel cell stack 10, and an electronic control unit (ECU) 70 that controls the above sections.

Fuel Cell Stack

The fuel cell stack 10 is a stack of a plurality of (for example, 200 to 400) solid polymer cells connected together in series. Each cell includes an MEA and two separators between which the MEA is disposed. The MEA includes an electrolyte membrane (solid polymer membrane), such as a monovalent cation exchange membrane, and an anode and a cathode (electrodes) between which the electrolyte membrane is disposed.

The anode and the cathode each include a conductive porous substrate such as carbon paper and a catalyst (such as platinum or ruthenium) supported thereon to cause an electrode reaction in the anode or cathode.

The separators have grooves for supplying hydrogen or air to the entire surfaces of the MEAs and through-holes for supplying hydrogen or air to all the cells. These grooves and through-holes function as the anode flow channel 11 (fuel gas flow channel) and the cathode flow channel 12 (oxidant gas flow channel).

Hydrogen supplied through the anode flow channel 11 to each anode undergoes an electrode reaction represented by formula (1), and air supplied through the cathode flow channel 12 to each cathode undergoes an electrode reaction represented by formula (2):

$$2H_2 \rightarrow 4H^+ + 4e^- \tag{1}$$

$$O_2 + 4H^+ + 4e^- \rightarrow 2H_2O \tag{2}$$

These reactions cause a potential difference (open-circuit voltage (OCV)) in each cell. The fuel cell stack 10 generates electricity when electrically connected to an external circuit such as a motor 51 such that a current flows therethrough.

The fuel cell stack 10 has the property of allowing hydrogen in the anode flow channel 11 to permeate through (cross over) the electrolyte membrane into the cathode flow channel 12 as molecules. The permeation rate (L/s) of hydrogen from the anode flow channel 11 into the cathode flow channel 12 tends to increase with increasing difference in hydrogen partial pressure (hydrogen partial pressure difference) between the anode flow channel 11 and the cathode flow channel 12.

Figure 2:
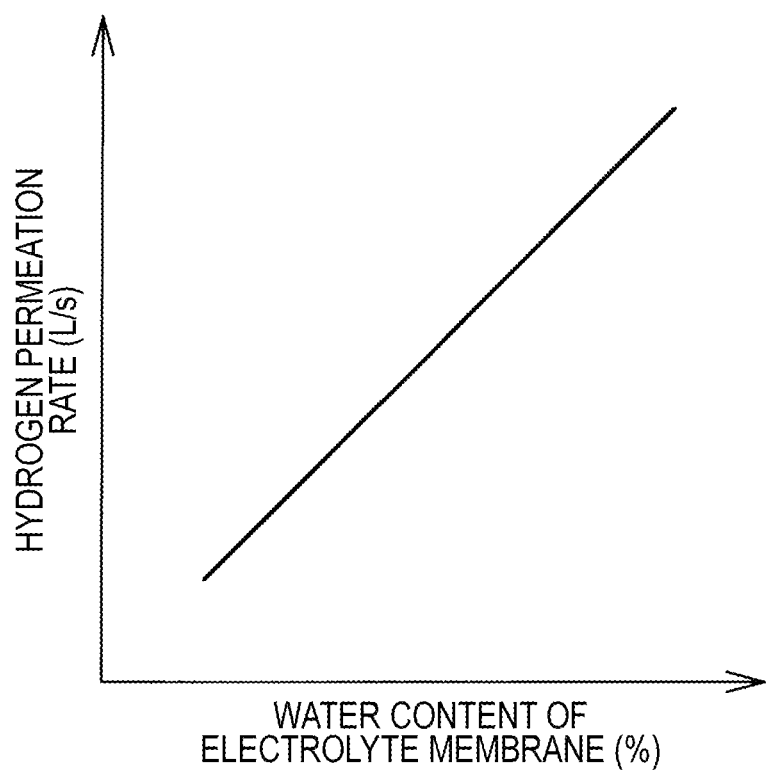
FIG. 2 is a graph illustrating the relationship between the water content (%) of an electrolyte membrane and hydrogen permeation rate (L/s).
Figure 5:
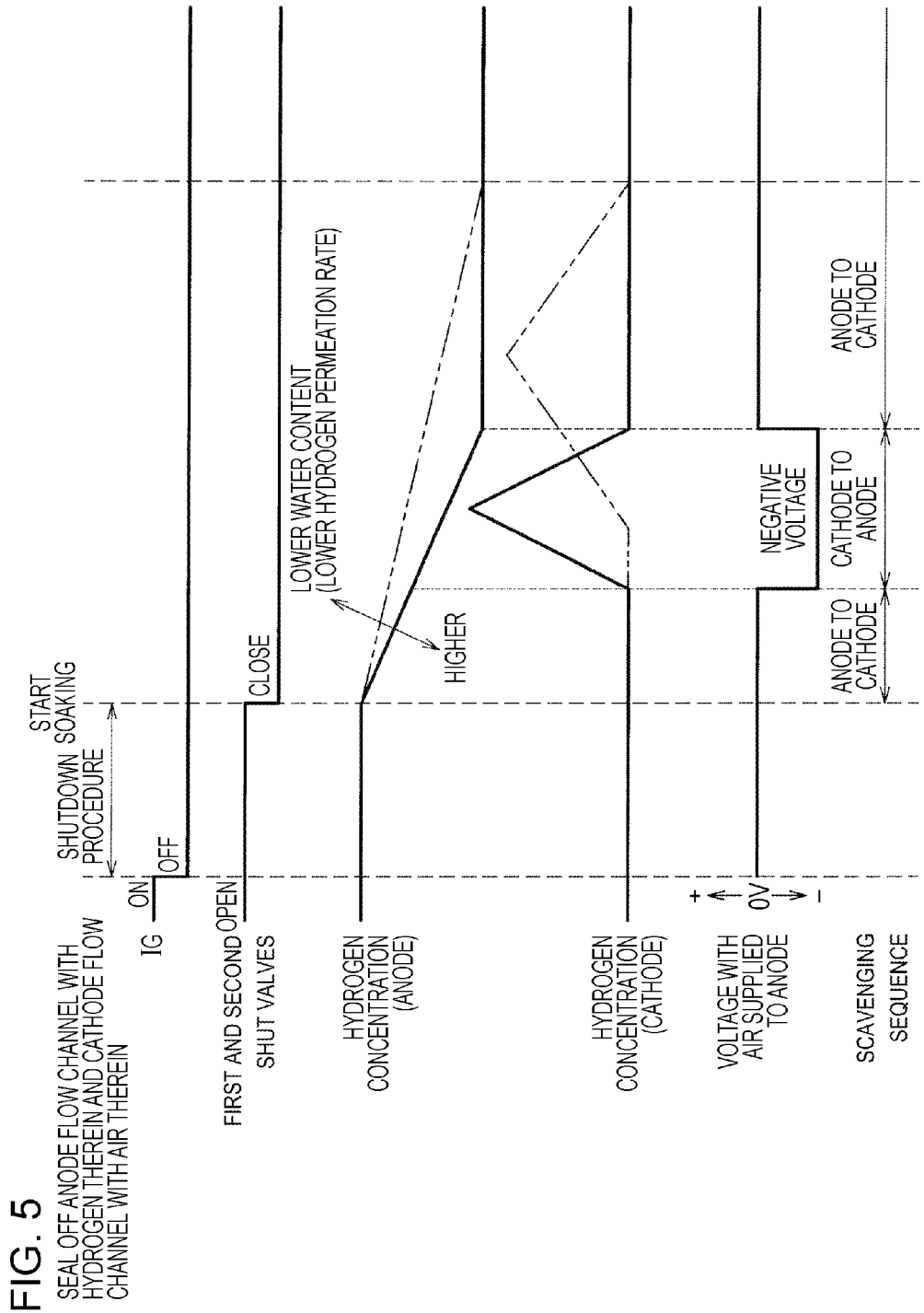
FIG. 5 is a timing chart illustrating an example of the operation of the fuel cell system according to the first embodiment.

As shown in FIG. 2, the hydrogen permeation rate tends to increase with increasing water content (%) of the electrolyte membrane (see FIG. 5). The water content (%) of the electrolyte membrane refers to the proportion (%) of water contained in the electrolyte membrane.

To ensure sufficient proton ($H^+$) transportability, a humidifier (not shown), described later, for humidifying air flowing toward the cathode flow channel 12 is usually provided so that the water content (%) of the electrolyte membrane approaches the target water content (%). The water content (%) of the electrolyte membrane varies slightly depending on factors such as the outside temperature and humidity, the atmospheric pressure, and the amount of water produced at the cathode (the operating status of the fuel cell stack 10).

That is, the water content of the electrolyte membrane tends to increase with decreasing outside temperature, increasing outside humidity, increasing atmospheric pressure, and increasing amount of water produced at the cathode, although it depends largely on the operating status of the fuel cell stack 10 and the amount of air supplied before shutdown. After the fuel cell stack 10 is operated at a higher output, the electrolyte membrane tends to contain a larger amount of water produced during operation and therefore have a higher water content. After air is supplied at a higher rate, the electrolyte membrane tends to dry more quickly and therefore have a lower water content.

The first embodiment assumes that the water content (%) of the electrolyte membrane is constant when, as described later, the anode flow channel 11 is sealed off with hydrogen therein and the cathode flow channel 12 is sealed off with air therein after the shutdown of the fuel cell stack 10. That is, the first embodiment assumes that the permeation rate (L/s) of hydrogen from the anode flow channel 11 into the cathode flow channel 12 is attributed solely to the hydrogen partial pressure difference (see FIG. 4). With this assumption, the first embodiment determines whether or not hydrogen remains in the cathode flow channel 12 based on a first predetermined period of time shown in FIG. 4, which is determined by, for example, preliminary testing.

Optionally, however, the fuel cell stack 10 may include a temperature sensor that detects the outside air temperature, a humidity sensor that detects the outside air humidity, and an atmospheric pressure sensor that detects that atmospheric pressure. Based on the outside air temperature, the outside air humidity, the atmospheric pressure, and the operating status before shutdown, the water content (%) of the electrolyte membrane may be corrected to change (correct) the criterion, namely, the first predetermined period of time (see FIG. 5).

For example, because the hydrogen permeation rate increases with increasing water content of the electrolyte membrane (1) as the outside air temperature decreases, the outside air humidity increases, and the atmospheric pressure increases, (2) as the output of the fuel cell stack 10 immediately before shutdown increases, and (3) as the amount of air supplied immediately before shutdown increases, the first predetermined period of time may be corrected such that it is shortened and shifted closer to the time when the fuel cell stack 10 is shut down.

Anode Section

Referring back to FIG. 1, the description is continued.

The anode section includes a hydrogen tank 21, a normally-closed shutoff valve 22, an ejector 23, a normally-closed purge valve 24, a normally-closed scavenge-gas discharging valve 25, and a temperature sensor 26 (temperature-detector).

The hydrogen tank 21 is connected to the inlet of the anode flow channel 11 through a pipe 21a, the shutoff valve 22, a pipe 22a, the ejector 23, and a pipe 23a. When the shutoff valve 22 is opened in response to an instruction from the ECU 70 to operate the fuel cell stack 10, hydrogen is supplied from the hydrogen tank 21 through the shutoff valve 22 to the anode flow channel 11.

The pipe 21a, the pipe 22a, and the pipe 23a form a fuel gas supply channel through which hydrogen (fuel gas) flows toward the anode flow channel 11 (fuel gas flow channel).

The outlet of the anode flow channel 11 is connected to an intake port of the ejector 23 through a pipe 23b. The pipe 23b returns an anode off-gas discharged from the anode flow channel 11, which contains unconsumed hydrogen, to the ejector 23, which then supplies the anode off-gas to the anode flow channel 11 again so that the hydrogen is circulated. The pipe 23b has a vapor-liquid separator (not shown) that separates liquid water from the anode off-gas.

The pipe 23b is connected at some position to a diluter 35, described later, through a pipe 24a, the purge valve 24, and a pipe 24b. The purge valve 24 is regularly opened by the ECU 70 to discharge (purge) impurities (such as water vapor and nitrogen) from the anode off-gas circulated through the pipe 23b during the operation of the fuel cell stack 10.

The pipe 23b is also connected to a pipe 34a, described later, through a pipe 25a, the scavenge-gas discharging valve 25, and a pipe 25b upstream of the position where the pipe 24a is connected. When the fuel cell stack 10 is scavenged, specifically, when the anode flow channel 11 is scavenged, the ECU 70 opens the scavenge-gas discharging valve 25 together with a scavenge-gas introducing valve 41, described later, while operating a compressor 31.

The fuel cell stack 10 is scavenged when the temperature (system temperature) of the fuel cell stack 10 detected by the temperature sensor 26 after the fuel cell stack 10 is shut down, that is, during system shutdown, is a predetermined temperature (e.g., 0° C. or 5° C.) or lower, at which it is determined that the fuel cell stack 10 will freeze.

The pipe 23b, the pipe 24a, the pipe 24b, the pipe 25a, and the pipe 25b form a fuel gas discharge channel through which the anode off-gas discharged from the anode flow channel 11 (fuel gas flow channel).

The shutoff valve 22 and the scavenge-gas introducing valve 41, described later, are disposed upstream of the anode flow channel 11, and the purge valve 24 and the scavenge-gas discharging valve 25 are disposed downstream of the anode flow channel 11. All these valves 22, 41, 24, 25 are normally-closed valves; in principle, they remain closed during the shutdown of the fuel cell stack 10 (during system shutdown) to seal off the anode flow channel 11. Accordingly, no outside air enters the anode flow channel 11 through, for example, the scavenge-gas discharging valve 25.

The temperature sensor 26 is attached to the pipe 23b near the outlet of the anode flow channel 11. The temperature sensor 26 detects the temperature in the pipe 23b as the temperature of the fuel cell stack 10 and outputs it to the ECU 70.

The position of the temperature sensor 26, however, is not limited thereto; for example, it may be attached to a pipe 33a, described later, to a pipe (not shown) through which refrigerant discharged from the fuel cell stack 10 flows, or to the fuel cell stack 10 itself. Alternatively, the temperature of the fuel cell stack 10 may be estimated from the outside air temperature detected by an outside air temperature sensor.

Cathode Section

The cathode section includes the compressor 31 (oxidant gas supply unit, scavenge gas supply unit), a normally-closed first shut valve 32, a normally-closed second shut valve 33, a normally-open back pressure valve 34, the diluter 35, and a hydrogen sensor 36 (fuel-gas-concentration detecting unit).

The compressor 31 is connected to the inlet of the cathode flow channel 12 through a pipe 31a, the first shut valve 32, and a pipe 32a. When operated in response to an instruction from the ECU 70, the compressor 31 takes in air containing oxygen and supplies it through the line including the pipe 31a to the cathode flow channel 12. When the fuel cell stack 10 is scavenged, the compressor 31 discharges air as a scavenge gas and supplies it to the anode flow channel 11 or the cathode flow channel 12, thus forming a scavenging device.

The compressor 31, the first shut valve 32, the second shut valve 33, the back pressure valve 34, the shutoff valve 22, the purge valve 24, and the scavenge-gas discharging valve 25 are powered by the fuel cell stack 10 during the operation of the fuel cell stack 10 and are powered by a battery 55, described later, during the shutdown of the fuel cell stack 10.

The pipe 31a and the pipe 32a form an oxidant gas supply channel through which air (oxidant gas) flows toward the cathode flow channel 12 (oxidant gas flow channel). The oxidant gas supply channel has the first shut valve 32.

The first shut valve 32 is a normally-closed electromagnetic valve that is controlled by the ECU 70. The first shut valve 32 is open during the operation of the fuel cell stack 10 (during system operation) and is closed after the fuel cell stack 10 is shut down, that is, during shutdown (during system shutdown).

The first shut valve 32 is, for example, a gate valve or ball valve operated by a solenoid or a stepper motor, or a butterfly valve operated by a stepper motor. Alternatively, the first shut valve 32 may be a normally-open valve, rather than a normally-closed valve. This also applies to the second shut valve 33.

The outlet of the cathode flow channel 12 is connected to the diluter 35 through the pipe 33a, the second shut valve 33, the pipe 33b, the back pressure valve 34, and the pipe 34a. A cathode off-gas (oxidant off-gas) discharged from the cathode flow channel 12 is discharged to the diluter 35 through the line including the pipe 33a.

The pipe 33a, the pipe 33b, the pipe 34a, and a pipe 35a, described later, form an oxidant gas discharge channel through which the cathode off-gas discharged from the cathode flow channel 12 (oxidant gas flow channel) flows. The oxidant gas discharge channel has the second shut valve 33.

The second shut valve 33 is a normally-closed electromagnetic valve that is controlled by the ECU 70. The second shut valve 33 is open during the operation of the fuel cell stack 10 (during system operation) and is closed after the fuel cell stack 10 is shut down, that is, during shutdown (during system shutdown).

The back pressure valve 34 is a normally-open valve such as a butterfly valve. The opening thereof is controlled by the ECU 70 depending on the electricity demand, for example, accelerator opening.

The dilutor 35 is a container having an inner dilution space in which the anode off-gas and the cathode off-gas are mixed together to dilute hydrogen in the anode off-gas with the cathode off-gas (diluent gas). The diluted gas is discharged outside through the pipe 35a.

The hydrogen sensor 36 is a sensor that detects the hydrogen concentration (fuel gas concentration) by, for example, catalytic combustion and is attached to the pipe 33a. The hydrogen sensor 36 detects the hydrogen concentration in the pipe 33a as the hydrogen concentration in the cathode flow channel 12 and outputs it to the ECU 70.

As shown in FIG. 1, the hydrogen sensor 36 is disposed between the first shut valve 32 and the second shut valve 33 so that it can detect the hydrogen concentration in the cathode flow channel 12 after the cathode flow channel 12 is sealed off by closing the first shut valve 32 and the second shut valve 33. The position of the hydrogen sensor 36, however, is not limited thereto; for example, it may be attached directly to the cathode flow channel 12 or to the pipe 32a.

A humidifier (not shown) is disposed across the pipe 32a and the pipe 33a. The humidifier includes a plurality of hollow fiber membranes with water permeability. These hollow fiber membranes facilitate water exchange between the air flowing toward the cathode flow channel 12 and the humid cathode off-gas discharged from the cathode flow channel 12 to humidify the air flowing toward the cathode flow channel 12.

Scavenge-Gas Introducing Section

The scavenge-gas introducing section includes the scavenge-gas introducing valve 41, which is a normally-closed valve. The scavenge-gas introducing valve 41 is connected upstream thereof to the pipe 31a through a pipe 41a and is connected downstream thereof to the pipe 23a through a pipe 41b. When the anode flow channel 11 is scavenged, the ECU 70 opens the scavenge-gas introducing valve 41 while operating the compressor 31, thus introducing the scavenge gas from the compressor 31 into the anode flow channel 11.

Power Control Section

The power control section includes the motor 51, a power drive unit (PDU) 52, a power controller 53, a contactor 54, and the battery 55 (power storage unit). The motor 51 is connected to an output terminal (not shown) of the fuel cell stack 10 through, in sequence, the PDU 54, the power controller 53, and the contactor 54. The battery 55 is connected to the power controller 53.

The motor 51 produces driving force for driving the fuel cell vehicle.

The PDU 54 converts direct-current (DC) power supplied by the fuel cell stack 10 and/or the battery 55 to three-phase alternating-current (AC) power and outputs it to the motor 51 based on an instruction from the ECU 70.

The power controller 53 controls the operation of the fuel cell stack 10 and the charge and discharge of the battery 55 based on an instruction from the ECU 70. The power controller 53 includes various electronic circuits such as a DC-DC chopper circuit.

The contactor 54 is a switch for electrically turning on (making) and off (breaking) the connection between the fuel cell stack 10 and the external circuit including the motor 51 based on an instruction from the ECU 70.

The battery 55 is a rechargeable power storage unit such as an assembled battery including a plurality of lithium ion battery cells.

IG

An ignition (IG) 61 is a switch for activating the fuel cell system 1 (fuel cell vehicle) and is disposed near the driver's seat. The IG 61 is connected to the ECU 70, which detects an on/off signal from the IG 61.

ECU

The ECU 70 (control unit) is a control unit for electronic control of the fuel cell system 1, including a central processing unit (CPU), a read-only memory (ROM), a random-access memory (RAM), various interfaces, and electronic circuits. The ECU 70 controls various devices based on programs stored therein to execute various procedures.

Shut valve Control Function of ECU

The ECU 70 (shut valve controller) has the function of controlling the opening and closing of the first shut valve 32 and the second shut valve 33.

Need-For-Scavenging Determining Function of ECU

The ECU 70 has the function of determining the need for scavenging of the fuel cell stack 10 after the fuel cell stack 10 is shut down, that is, during system shutdown.

In this embodiment, the ECU 70 determines that the fuel cell stack 10 needs scavenging if the temperature of the fuel cell stack 10 detected by the temperature sensor 26 is the predetermined temperature or lower. The predetermined temperature is a temperature at which it is determined that the fuel cell stack 10 will freeze unless it is scavenged. The predetermined temperature is determined by, for example, preliminary testing and is set to, for example, 0° C. or 5° C.

Elapsed-Time Detecting Function of ECU

The ECU 70 (elapsed-time detector) has the function of detecting the time elapsed from the shutdown of the fuel cell stack 10 to the present using a built-in clock. In this case, the starting point of the elapsed time may be appropriately changed, for example, to (1) the time when the IG 61 is turned off, to (2) the time when the contactor 54 is turned off, to (3) the time when soaking is started after the procedures such as the opening of the shutoff valve 22, or to (4) the time when the sealing of the cathode flow channel 12 is started (when the first shut valve 32 and the second shut valve 33 are opened).

Scavenging-Sequence Determining Function of ECU

The ECU 70 has the function of determining the scavenging sequence of the anode flow channel 11 and the cathode flow channel 12 when the fuel cell stack 10 is scavenged.

Specifically, the ECU 70 determines to scavenge the cathode flow channel 12 and then the anode flow channel 11 to prevent polarity inversion if (1) it is determined that hydrogen permeated through the electrolyte membrane remains in the cathode flow channel 12. Conversely, the ECU 70 determines to scavenge the anode flow channel 11 and then the cathode flow channel 12 if (2) it is determined that no hydrogen remains in the cathode flow channel 12.

More specifically, the ECU 70 determines to scavenge the cathode flow channel 12 and then the anode flow channel 11 if (1) the time elapsed from the shutdown of the fuel cell stack 10 to the present (when the ECU 70 determines that the fuel cell stack 10 needs scavenging) is within the first predetermined period of time. Conversely, the ECU 70 determines to scavenge the anode flow channel 11 and then the cathode flow channel 12 if (2) the time elapsed from the shutdown of the fuel cell stack 10 to the present (when the ECU 70 determines that the fuel cell stack 10 needs scavenging) is outside the first predetermined period of time.

The first predetermined period of time is the period of time during which it is determined that hydrogen permeated from the anode flow channel 11 through the electrolyte membrane into the cathode flow channel 12 remains in the cathode flow channel 12. The first predetermined period of time is determined by preliminary testing or simulation (see FIG. 4).

Scavenging-Executing Function of ECU

The ECU 70 has the function of executing scavenging of the anode flow channel 11 (anode scavenging) and scavenging of the cathode flow channel 12 (cathode scavenging) according to the determined scavenging sequence. In this case, the ECU 70 appropriately controls the compressor 31, the first shut valve 32, the second shut valve 33, the scavenge-gas introducing valve 41, and the scavenge-gas discharging valve 25.

The ECU 70 executes anode scavenging at a higher scavenge gas flow rate by increasing the rotational speed of the compressor 31 because the anode flow channel 11 is finer and is therefore more difficult to scavenge than the cathode flow channel 12.

Operation of Fuel Cell System

Next, the operation of the fuel cell system 1 is illustrated with reference to FIG. 3.

Figure 3:
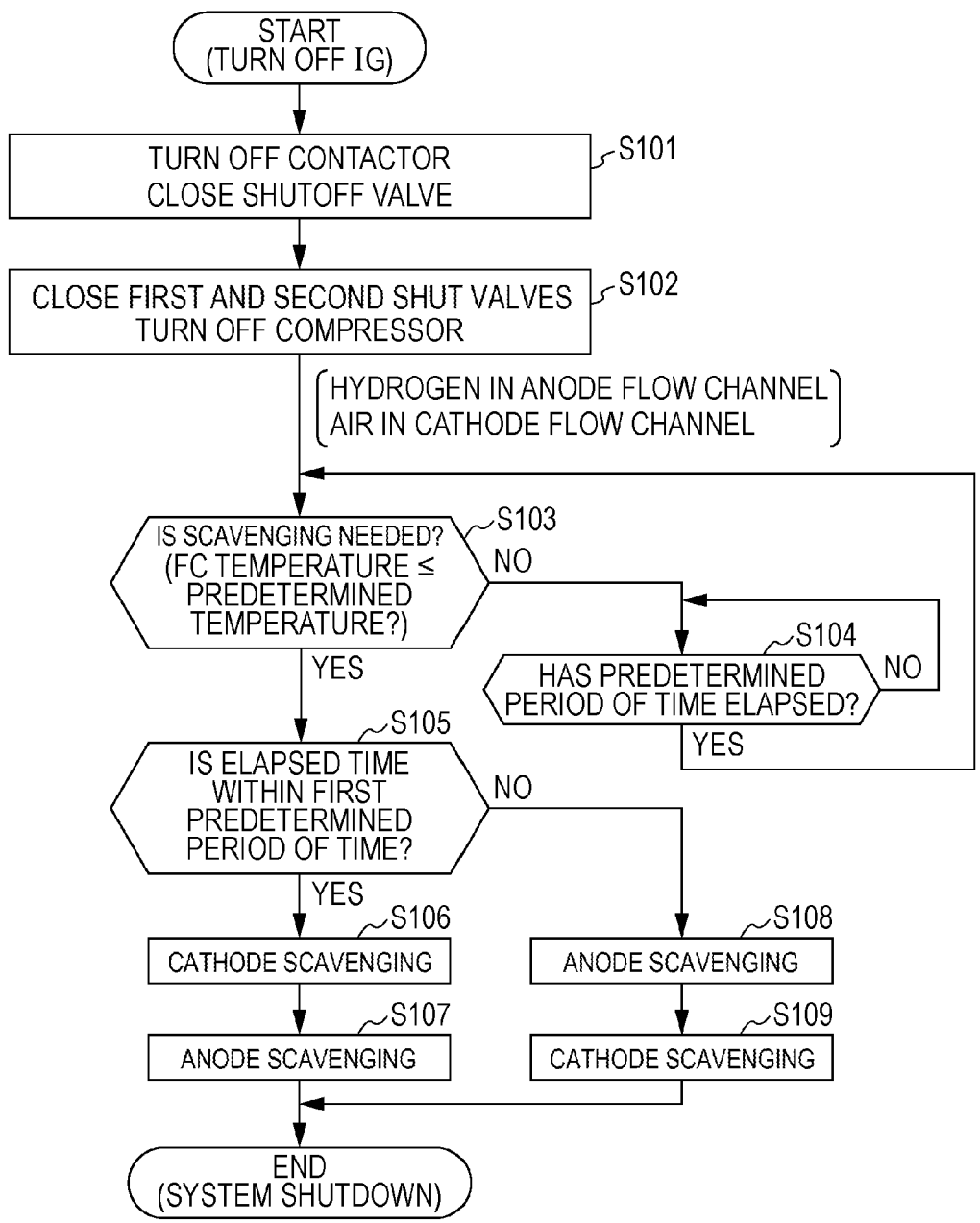
FIG. 3 is a flowchart illustrating the operation of the fuel cell system according to the first embodiment.

When the IG 61 is turned off, the ECU 70 detects an off signal and starts the process shown in FIG. 3. Initially, the fuel cell stack 10 is being supplied with hydrogen and air and is being operated by controlling the power controller 53 depending on the accelerator opening fed from the accelerator (not shown).

In Step S101, the ECU 70 turns off the contactor 54 to electrically isolate the fuel cell stack 10 from the external circuit, thus shutting down the fuel cell stack 10.

The ECU 70 also closes the shutoff valve 22, after which no hydrogen in the hydrogen tank 21 is wasted. Because the purge valve 24, the scavenge-gas discharging valve 25, and the scavenge-gas introducing valve 41 are normally closed, the anode flow channel 11 is sealed off (blocked off) from the outside. Accordingly, hydrogen does not leak outside in large quantities from the anode flow channel 11, and no outside air enters the anode flow channel 11.

In Step S102, the ECU 70 closes the first shut valve 32 and the second shut valve 33 to seal off (block off) the cathode flow channel 12 from the outside. Accordingly, no outside air enters the cathode flow channel 12, thus preventing degradation of the fuel cell stack 10.

The ECU 70 also shuts down (turns off) the compressor 31, after which no power is wasted by the compressor 31.

As a result, mainly hydrogen remains in the anode flow channel 11, and mainly air remains in the cathode flow channel 12. Accordingly, the hydrogen partial pressure in the anode flow channel 11 is higher than the hydrogen partial pressure in the cathode flow channel 12.

As time elapses in this state, as described above, the difference in hydrogen partial pressure (hydrogen partial pressure difference) between the anode flow channel 11 and the cathode flow channel 12 causes hydrogen to permeate from the anode flow channel 11 through the MEA (electrolyte membrane) into the cathode flow channel 12. That is, hydrogen crosses over from the anode flow channel 11 to the cathode flow channel 12.

The hydrogen concentration in the anode flow channel 11 decreases as hydrogen permeates into the cathode flow channel 12. The hydrogen concentration in the cathode flow channel 12, however, does not increase for a predetermined initial period of time because the hydrogen permeated into the cathode flow channel 12 initially reacts with oxygen remaining on the surface of the cathode catalyst to produce water; it increases after the initial period of time elapses (see FIG. 4).

Although the hydrogen permeation rate tends to increase with increasing water content of the electrolyte membrane (see FIG. 2), the example shown assumes that the water content of the electrolyte membrane is constant.

The hydrogen permeation rate becomes substantially zero when the hydrogen partial pressure in the anode flow channel 11 and the hydrogen partial pressure in the cathode flow channel 12 become equal.

The hydrogen concentration in the anode flow channel 11 then decreases gradually (see FIG. 4) as hydrogen leaks outside at an extremely low flow rate from the anode flow channel 11 through extremely small gaps formed around seals (O-rings) built into the components such as the scavenge-gas discharging valve 25 and extremely small gaps formed around seals built into the fuel cell stack 10. The hydrogen concentration in the cathode flow channel 12 decreases gradually (see FIG. 4) as hydrogen leaks outside at an extremely low flow rate from the cathode flow channel 12 through extremely small gaps formed around seals (O-rings) built into the first shut valve 32 and the second shut valve 33 and extremely small gaps formed around seals built into the fuel cell stack 10.

In Step S103, the ECU 70 determines whether or not the fuel cell stack 10 needs scavenging. Specifically, the ECU 70 determines whether or not the temperature of the fuel cell stack 10 detected by the temperature sensor 26 is a predetermined temperature (such as 0° C. or 5° C.) or lower, at which it is determined that the fuel cell stack 10 should be scavenged.

If the ECU 70 determines that the fuel cell stack 10 needs scavenging (YES in Step S103), it proceeds to Step S105. Otherwise, if the ECU 70 determines that the fuel cell stack 10 does not need scavenging (NO in Step S103), it proceeds to Step S104.

In Step S104, the ECU 70 determines whether or not a predetermined period of time (e.g., 30 minutes to 1 hour) has elapsed since the NO determination in Step S103.

If the ECU 70 determines that the predetermined period of time has elapsed (YES in Step S104), it proceeds to Step S103. Otherwise, if the ECU 70 determines that the predetermined period of time has not elapsed (NO in Step S104), it repeats Step S104.

In this way, the determination in Step S103 is repeated each time the predetermined period of time elapses (YES in Step S104), thus preventing the fuel cell stack 10 from freezing.

In Step S105, the ECU 70 determines whether or not the time elapsed from the shutdown of the fuel cell stack 10 is within the first predetermined period of time. In this example, as shown in FIG. 4, the starting point of the elapsed time is the time when soaking is started after the shutdown procedure, including turning off the contactor 54, is complete.

If the ECU 70 determines that the elapsed time is within the first predetermined period of time (YES in Step S105), it determines that hydrogen remains in the cathode flow channel 12 (see FIG. 4) and proceeds to Step S106.

Otherwise, if the ECU 70 determines that the elapsed time is outside the first predetermined period of time (NO in Step S105), it determines that no hydrogen remains in the cathode flow channel 12 (see FIG. 4) and proceeds to Step S108.

In Step S106, the ECU 70 executes cathode scavenging (scavenges the cathode flow channel 12).

Specifically, the ECU 70 opens the first shut valve 32 and the second shut valve 33 and activates the compressor 31, where the back pressure valve 34 is preferably fully open.

Air discharged from the compressor 31 is then supplied to the cathode flow channel 12 as a scavenge gas. This scavenge gas forces hydrogen and water (water vapor, condensed water) out of the cathode flow channel 12 to the outside, thus scavenging the cathode flow channel 12.

Cathode scavenging is executed for a predetermined cathode scavenging time determined by, for example, preliminary testing.

After the cathode scavenging time elapses, the ECU 70 determines that cathode scavenging is complete and proceeds to Step S107, where the first shut valve 32 and the second shut valve 33 remain open.

In Step S107, the ECU 70 executes anode scavenging (scavenges the anode flow channel 11).

Specifically, the ECU 70 opens the scavenge-gas introducing valve 41 and the scavenge-gas discharging valve 25 while operating the compressor 31, where the purge valve 24 may also be opened.

The scavenge gas discharged from the compressor 31 is then supplied through the scavenge-gas introducing valve 41 to the anode flow channel 11. This scavenge gas forces hydrogen and water (water vapor, condensed water) out of the anode flow channel 11 to the outside, thus scavenging the anode flow channel 11.

In this case, the rotational speed of the compressor 31 is set to be higher than that in cathode scavenging (Step S106) to increase the scavenge gas flow rate because the flow channels in the anode section, including the anode flow channel 11, have a smaller cross-sectional area than those in the cathode section, and also because the anode section includes the hydrogen circulation line formed by the pipe 23b, which is structurally difficult to scavenge.

The scavenge gas distribution ratio of the anode flow channel 11 to the cathode flow channel 12 is also controlled depending on the opening of the back pressure valve 34 because the first shut valve 32 and the second shut valve 33 remain open. That is, as the opening of the back pressure valve 34 is decreased, a larger amount of scavenge gas flows through the anode flow channel 11.

During anode scavenging, part of the scavenge gas coming from the compressor 31 is discharged outside through the cathode flow channel 12, the pipe 33a, the pipe 33b, the pipe 34a, and the pipe 35a. Accordingly, the hydrogen forced out of the anode flow channel 11 by the scavenge gas while being diluted therewith is further diluted with the scavenge gas (cathode off-gas) flowing through the line including the pipe 34a so that no concentrated hydrogen is discharged outside.

Anode scavenging is executed for a predetermined anode scavenging time determined by, for example, preliminary testing.

After the anode scavenging time elapses, the ECU 70 determines that anode scavenging is complete. The ECU 70 then stops the compressor 31 and closes the scavenge-gas introducing valve 41 and the scavenge-gas discharging valve 25. In the example shown, the first shut valve 32 and the second shut valve 33 remain open, although they may be closed.

Because the first shut valve 32 and the second shut valve 33 remain open, outside air enters the cathode flow channel 12, although it does not degrade the fuel cell stack (cathode) because no hydrogen remains in the cathode flow channel 12 after cathode scavenging.

Otherwise, if hydrogen remained in the cathode flow channel 12, it would react on the cathode catalyst with oxygen contained in the outside air entering the cathode flow channel 12, thus degrading the cathode (catalyst).

The ECU 70 then proceeds to END, where the fuel cell system 1 is during shutdown.

In Step S108, as in Step S107, the ECU 70 executes anode scavenging for the anode scavenging time described above.

Figure 4:
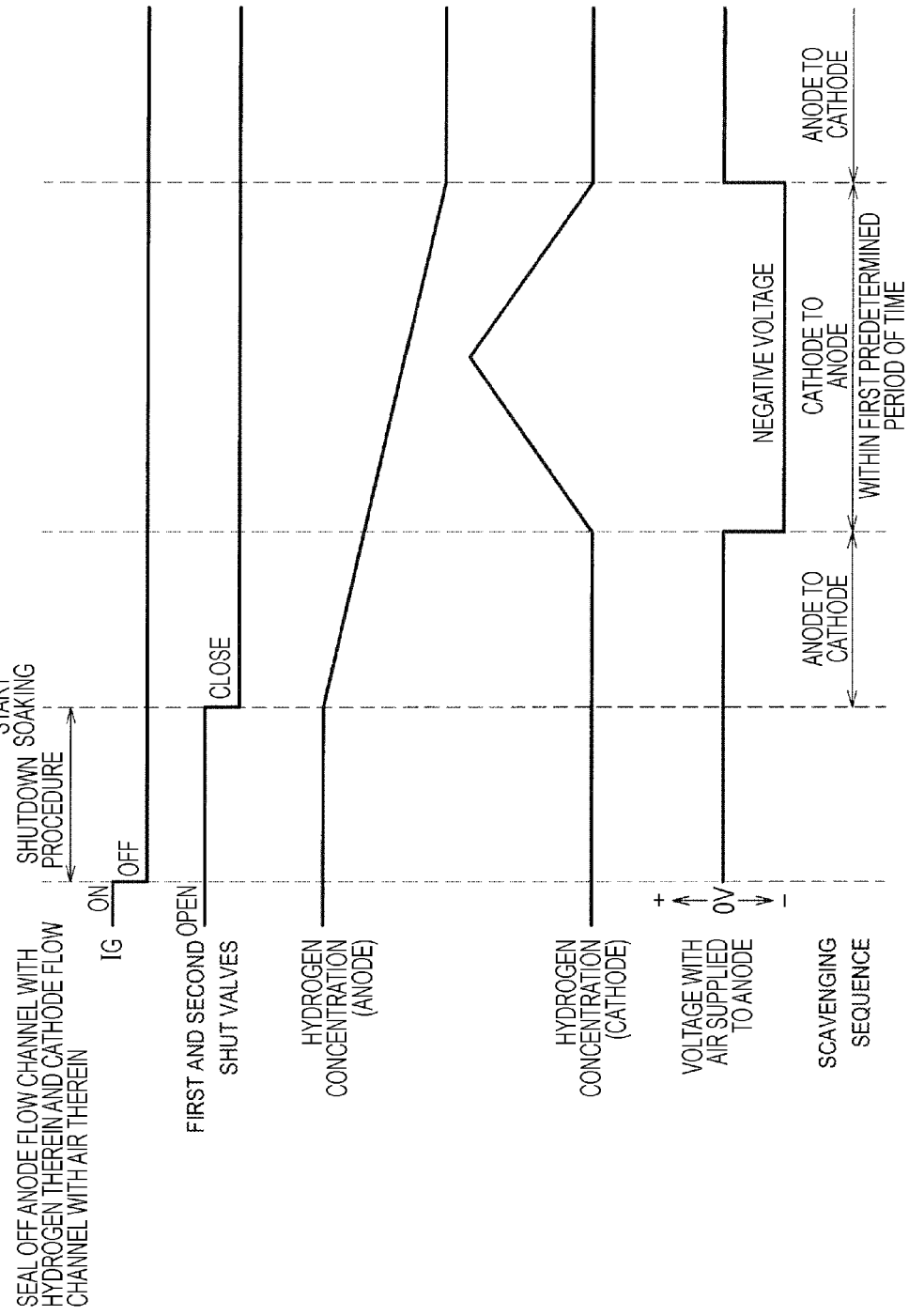
FIG. 4 is a timing chart illustrating an example of the operation of the fuel cell system according to the first embodiment.

If the ECU 70 executes anode scavenging before the first predetermined period of time, concentrated hydrogen will be forced out of the anode flow channel 11 because a large amount of hydrogen remains in the anode flow channel 11 (see FIG. 4). In this case, the first shut valve 32 and the second shut valve 33 are opened to supply part of the scavenge gas to the cathode flow channel 12. Thus, the hydrogen coming from the anode flow channel 11 is diluted with the scavenge gas (cathode off-gas) discharged from the cathode flow channel 12 and flowing through the line including the pipe 34a.

In Step S109, as in Step S108, the ECU 70 executes cathode scavenging for the cathode scavenging time described above.

After cathode scavenging is complete, the ECU 70 proceeds to END, where the fuel cell system 1 is during shutdown.

Advantages of Fuel Cell System

The fuel cell system 1 has the following advantages.

When the fuel cell stack 10 is scavenged (YES in Step S103), if the time elapsed from shutdown (the start of soaking) is within the first predetermined period of time (YES in Step S105), the ECU 70 determines that hydrogen remains in the cathode flow channel 12 and executes cathode scavenging (Step S106) and then anode scavenging (Step S107). The fuel cell stack 10 can therefore be scavenged without causing polarity inversion (negative voltage). That is, the fuel cell stack 10 is not degraded by polarity inversion (negative voltage).

Conversely, when the fuel cell stack 10 is scavenged (YES in Step S103), if the time elapsed from shutdown (the start of soaking) is outside the first predetermined period of time (NO in Step S105), the ECU 70 determines that no hydrogen remains in the cathode flow channel 12 and executes anode scavenging (Step S108) and then cathode scavenging (Step S109) to scavenge the fuel cell stack 10.

During the transition from anode scavenging (Step S108) to cathode scavenging (Step S109), the rotational speed of the compressor 31 decreases, and accordingly its noise becomes smaller. This makes the user near the fuel cell system 1 feel less strange than when the noise becomes larger as the rotational speed increases.

Cathode scavenging is preceded by anode scavenging, in which the compressor 31 operates at a higher voltage and therefore consumes more power. Cathode scavenging can therefore be executed even if the voltage of the battery 55 drops after anode scavenging is executed, so that the scavenging procedure is less likely to be interrupted.

Modifications of First Embodiment

While one embodiment has been described above, it should not be construed as limiting. For example, the following modifications are permitted, which may be combined with the embodiment described later.

While the first embodiment illustrates the case where the fuel cell stack 10 is scavenged with air discharged from the compressor 31 as a scavenge gas, the fuel cell stack 10 may instead be scavenged with another gas. For example, the fuel cell stack 10 may be scavenged with nitrogen (inert gas) supplied from a nitrogen tank (inert gas tank) as a scavenge gas.

While the first embodiment illustrates the case where the ECU 70 determines whether or not hydrogen remains in the cathode flow channel 12 based on the time elapsed from the shutdown of the fuel cell stack 10 and the first predetermined period of time, it may instead determine whether or not hydrogen remains in the cathode flow channel 12 based on, for example, the hydrogen concentration detected by the hydrogen sensor 36.

Specifically, the ECU 70 may determine that hydrogen remains in the cathode flow channel 12 and scavenge the cathode flow channel 12 and then the anode flow channel 11 if the hydrogen concentration detected by the hydrogen sensor 36 is higher than a predetermined hydrogen concentration (predetermined fuel gas concentration). Conversely, the ECU 70 may determine that no hydrogen remains in the cathode flow channel 12 and scavenge the anode flow channel 11 and then the cathode flow channel 12 if the hydrogen concentration is the predetermined hydrogen concentration or lower.

The predetermined hydrogen concentration is set to a concentration at which it is determined that the electrodes of the fuel cell stack 10 will be inverted in polarity (polarity inversion) because of hydrogen remaining in the cathode flow channel 12 if the anode flow channel 11 and then the cathode flow channel 12 is scavenged.

This configuration may also be applied to the second embodiment described later.

Alternatively, the ECU 70 may determine whether or not hydrogen remains in the cathode flow channel 12 based on the presence or absence of a procedure other than the scavenging of hydrogen from the anode flow channel 11 and/or the cathode flow channel 12 (e.g., a hydrogen consumption procedure for continued operation of the fuel cell stack 10).

While the first embodiment illustrates the case where the fuel cell system 1 is mounted on a fuel cell vehicle, it may instead be mounted on another mobile unit such as a motorcycle, train, or ship. Alternatively, the first embodiment may be applied to stationary fuel cell systems for home use and fuel cell systems built into hot water systems.

Second Embodiment

Figure 6:
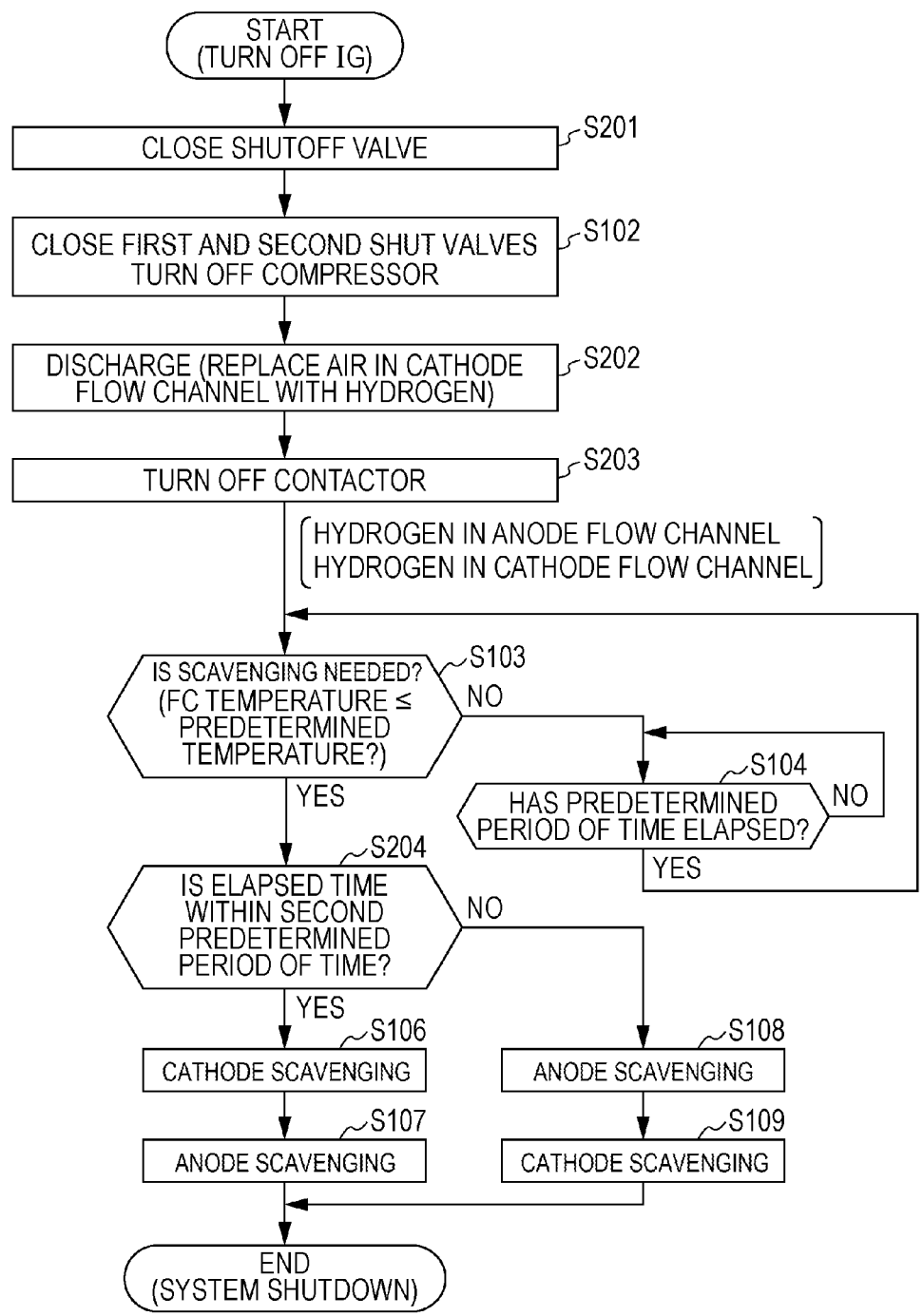
FIG. 6 is a flowchart illustrating the operation of a fuel cell system according to a second embodiment.

Next, the second embodiment will be described with reference to FIGS. 6 and 7.

In this embodiment, the program installed in the ECU 70 is different from that of the first embodiment, and therefore its operation differs in part.

Operation of Fuel Cell System

In the second embodiment, when the IG 61 is turned off, the ECU 70 proceeds to Step S201, where the ECU 70 closes the shutoff valve 22. The anode flow channel 11 is sealed off because the purge valve 24, the scavenge-gas discharging valve 25, and the scavenge-gas introducing valve 41 are closed.

In the example shown, the shutoff valve 22 is closed, and the fuel cell stack 10 is electrically discharged using hydrogen remaining in the line including the anode flow channel 11, as described later. However, if it is determined that the amount of remaining hydrogen is insufficient to properly discharge the fuel cell system 1, the shutoff valve 22 may be left open; it may be closed after discharge.

In Step S102, the ECU 70 closes the first shut valve 32 and the second shut valve 33 and turns off the compressor 31. Thus, the cathode flow channel 12 is sealed off.

The ECU 70 then proceeds to Step S202.

In Step S202, the ECU 70 discharges (electrically discharges) the fuel cell stack 10 to replace the air in the cathode flow channel 12 with hydrogen.

Specifically, with the anode flow channel 11 and the cathode flow channel 12 sealed off and the contactor 54 turned off, the ECU 70 controls the power controller 53 to operate the fuel cell stack 10. The power generated by the fuel cell stack 10 is used to, for example, charge the battery 55. Alternatively, the power may be converted to heat by supplying it to a discharge resistor (not shown).

During the operation, hydrogen remaining in the anode flow channel 11 and air (oxygen) remaining in the cathode flow channel 12 are consumed.

The volume V1 of the sealed space including the anode flow channel 11 in the anode section, that is, the space spaced off by the shutoff valve 22, the scavenge-gas introducing valve 41, the purge valve 24, and the scavenge-gas discharging valve 25 (anode sealed space), is larger than the volume V2 of the sealed space including the cathode flow channel 12 in the cathode section, that is, the space spaced off by the first shut valve 32 and the second shut valve 33 (cathode sealed space) (V1>V2).

Hence, as the fuel cell stack 10 is operated (discharged), the oxygen in the cathode sealed space runs out before the hydrogen in the anode sealed space does.

As the fuel cell stack 10 is further operated (discharged), with no oxygen remaining in the cathode sealed space (cathode flow channel 12), the hydrogen concentration in the cathode flow channel 12 increases (see FIG. 7) through a reaction on the cathode catalyst represented by formula (3):

$$4H^+ + 4e^- \rightarrow 2H_2 \qquad (3)$$

Thus, in the second embodiment, the hydrogen tank 21, the power controller 53, the battery 55, and the ECU 70 form a hydrogen-concentration increasing unit (fuel-gas-concentration increasing unit) that increases the hydrogen concentration in the cathode flow channel 12.

Alternatively, for example, the pipe 23a and the pipe 32a may be connected with another pipe (not shown) having a normally-closed electromagnetic valve. The electromagnetic valve may be opened to directly introduce hydrogen into the cathode flow channel 12, thus increasing the hydrogen concentration in the cathode flow channel 12.

Discharge (hydrogen-concentration increasing procedure) is executed for a predetermined discharge time determined by, for example, preliminary testing.

After the discharge time elapses, the ECU 70 determines that discharge is complete, that is, determines that the hydrogen concentration in the cathode flow channel 12 has increased to a predetermined concentration and that hydrogen replacement is complete. The ECU 70 then controls the power controller 53 to shut down the fuel cell stack 10.

The ECU 70 then proceeds to Step S203, where the ECU 70 turns off the contactor 54.

As a result, mainly hydrogen remains in the anode flow channel 11 and the cathode flow channel 12. As in the first embodiment, no hydrogen permeates from the anode flow channel 11 into the cathode flow channel 12 based on their hydrogen partial pressure difference, and no hydrogen is consumed on the cathode catalyst.

Instead, hydrogen leaks outside at an extremely low flow rate from the anode flow channel 11 and the cathode flow channel 12 through an extremely small gap formed around a seal (O-ring) built into the scavenge-gas discharging valve 25 and extremely small gaps formed around seals built into the fuel cell stack 10. Accordingly, hydrogen remains in the cathode flow channel 12 for a longer period of time than in the first embodiment.

In the second embodiment, the ECU 70 determines that hydrogen remains in the cathode flow channel 12 if the time elapsed from the shutdown of the fuel cell stack 10 is within a second predetermined period of time. The second predetermined period of time is determined by, for example, preliminary testing. The second predetermined period of time may be changed (corrected) based on the atmospheric pressure because hydrogen leaks outside more easily from the cathode flow channel 12 at lower atmospheric pressures.

The ECU 70 then proceeds to Step S103, where if the ECU 70 determines that the fuel cell stack 10 needs scavenging (YES in Step S103), it proceeds to Step S204.

In Step S204, the ECU 70 determines whether or not the time elapsed from the shutdown of the fuel cell stack 10 is within the second predetermined period of time. In this example, as shown in FIG. 7, the starting point of the elapsed time is the time when soaking is started after the shutdown procedure, including discharge, is complete.

If the ECU 70 determines that the elapsed time is within the second predetermined period of time (YES in Step S204), it determines that hydrogen remains in the cathode flow channel 12 (see FIG. 7) and proceeds to Step S106. The ECU 70 executes cathode scavenging (Step S106) and then anode scavenging (Step S107).

Otherwise, if the ECU 70 determines that the elapsed time is outside the second predetermined period of time (NO in Step S204), it determines that no hydrogen remains in the cathode flow channel 12 (see FIG. 7) and proceeds to Step S108. The ECU 70 executes anode scavenging (Step S108) and then cathode scavenging (Step S109).

Advantages of Fuel Cell System

The fuel cell system 1 has the following advantages.

The hydrogen concentration in the cathode flow channel 12 is increased by discharge (Step S202) until hydrogen replaces the air in the cathode flow channel 12. After discharge is complete, the anode flow channel 11 and the cathode flow channel 12 have such a small hydrogen partial pressure difference that no hydrogen permeates from the anode flow channel 11 into the cathode flow channel 12. In addition, hydrogen does not react with oxygen on the cathode catalyst because no oxygen remains in the cathode flow channel 12.

When the fuel cell stack 10 is scavenged (YES in Step S103), if the time elapsed from shutdown (the start of soaking) is within the second predetermined period of time (YES in Step S204), the ECU 70 determines that hydrogen remains in the cathode flow channel 12 and executes cathode scavenging (Step S106) and then anode scavenging (Step S107). The fuel cell stack 10 can therefore be scavenged without causing polarity inversion (negative voltage). That is, the fuel cell stack 10 is not degraded due to polarity inversion (negative voltage).

Conversely, when the fuel cell stack 10 is scavenged (YES in Step S103), if the time elapsed from shutdown (the start of soaking) is outside the second predetermined period of time (NO in Step S204), the ECU 70 determines that no hydrogen remains in the cathode flow channel 12 and executes anode scavenging (Step S108) and then cathode scavenging (Step S109) to scavenge the fuel cell stack 10.

During the transition from anode scavenging (Step S108) to cathode scavenging (Step S109), the rotational speed of the compressor 31 decreases, and accordingly its noise becomes smaller. This makes the user near the fuel cell system 1 feel less strange than when the noise becomes larger as the rotational speed increases.

In one aspect, a fuel cell system includes a fuel cell that has a fuel gas flow channel and an oxidant gas flow channel and that generates electricity as a fuel gas is supplied to the fuel gas flow channel and an oxidant gas is supplied to the oxidant gas flow channel; a fuel gas supply channel through which the fuel gas flows toward the fuel gas flow channel; a fuel off-gas discharge channel through which a fuel off-gas discharged from the fuel gas flow channel flows; an oxidant gas supply channel through which the oxidant gas flows toward the oxidant gas flow channel; an oxidant off-gas discharge channel through which an oxidant off-gas discharged from the oxidant gas flow channel flows; a first shut valve disposed in the oxidant gas supply channel; a second shut valve disposed in the oxidant off-gas discharge channel; a shut valve control unit that controls the first shut valve and the second shut valve; a temperature-detecting unit that detects the temperature of the fuel cell; a scavenging unit that scavenges the fuel gas flow channel and the oxidant gas flow channel with a scavenge gas if the temperature of the fuel cell detected by the temperature-detecting unit is a predetermined temperature or lower after the fuel cell is shut down; and an elapsed-time detecting unit that detects a time elapsed from the shutdown of the fuel cell. When the fuel cell is shut down, the shut valve control unit closes the first shut valve and the second shut valve to seal off the oxidant gas flow channel. The scavenging unit scavenges the oxidant gas flow channel and then the fuel gas flow channel if the elapsed time detected by the elapsed-time detecting unit is within a first predetermined period of time during which it is determined that the fuel gas remains in the oxidant gas flow channel. The scavenging unit scavenges the fuel gas flow channel and then the oxidant gas flow channel if the elapsed time detected by the elapsed-time detecting unit is outside the first predetermined period of time.

In this system, because the shut valve control unit closes the first shut valve and the second shut valve to seal off the oxidant gas flow channel when the fuel cell is shut down (system shutdown), no outside air enters the oxidant gas flow channel, thus reducing OH radicals. This prevents degradation of the fuel cell.

Because the scavenging unit scavenges the fuel gas flow channel and the oxidant gas flow channel with a scavenge gas if the temperature of the fuel cell detected by the temperature-detecting unit is the predetermined temperature or lower after the fuel cell is shut down, the fuel cell can be prevented from freezing.

The scavenging unit scavenges the oxidant gas flow channel and then the fuel gas flow channel if the elapsed time detected by the elapsed-time detecting unit is within the first predetermined period of time, during which it is determined that the fuel gas remains in the oxidant gas flow channel. This avoids a situation where the fuel cell has the fuel gas remaining in the oxidant gas flow channel and the scavenge gas (such as air) remaining in the fuel gas flow channel. Accordingly, the electrodes of the fuel cell are not inverted in polarity (polarity inversion), and no negative voltage occurs therebetween, thus preventing degradation of the fuel cell.

Conversely, the scavenging unit scavenges the fuel gas flow channel and then the oxidant gas flow channel if the elapsed time detected by the elapsed-time detecting unit is outside the first predetermined period of time, during which it is determined that the fuel gas remains in the oxidant gas flow channel.

In this case, the flow rate of the scavenge gas for scavenging the fuel gas flow channel is set to be higher than that for scavenging the oxidant gas flow channel because the fuel gas flow channel has a smaller cross-sectional area and is therefore more difficult to scavenge than the oxidant gas flow channel. That is, the rotational speed of a compressor for pumping the scavenge gas when the fuel gas flow channel is scavenged is set to be higher than when the oxidant gas flow channel is scavenged. Because the scavenging unit scavenges the fuel gas flow channel and then the oxidant gas flow channel, as described above, the rotational speed of the compressor decreases gradually during scavenging, and accordingly its noise becomes gradually smaller, thus making the user feel less strange.

If the rotational speed of the compressor decreases gradually in this way, the voltage applied to the compressor, which needs to be increased for operation at high rotational speed, decreases gradually as well. This reduces the possibility of the voltage supplied to the compressor falling below the required operating voltage in the event of a voltage drop due to an IR drop.

In another aspect, a fuel cell system includes a fuel cell that has a fuel gas flow channel and an oxidant gas flow channel and that generates electricity as a fuel gas is supplied to the fuel gas flow channel and an oxidant gas is supplied to the oxidant gas flow channel; a fuel gas supply channel through which the fuel gas flows toward the fuel gas flow channel; a fuel off-gas discharge channel through which a fuel off-gas discharged from the fuel gas flow channel flows; an oxidant gas supply channel through which the oxidant gas flows toward the oxidant gas flow channel; an oxidant off-gas discharge channel through which an oxidant off-gas discharged from the oxidant gas flow channel flows; a first shut valve disposed in the oxidant gas supply channel; a second shut valve disposed in the oxidant off-gas discharge channel; a shut valve control unit that controls the first shut valve and the second shut valve; a temperature-detecting unit that detects the temperature of the fuel cell; a scavenging unit that scavenges the fuel gas flow channel and the oxidant gas flow channel with a scavenge gas if the temperature of the fuel cell detected by the temperature-detecting unit is a predetermined temperature or lower after the fuel cell is shut down; and a fuel-gas-concentration detecting unit that detects a fuel gas concentration in the oxidant gas flow channel. When the fuel cell is shut down, the shut valve control unit closes the first shut valve and the second shut valve to seal off the oxidant gas flow channel. The scavenging unit scavenges the oxidant gas flow channel and then the fuel gas flow channel if the fuel gas concentration detected by the fuel-gas-concentration detecting unit is higher than a predetermined fuel gas concentration. The scavenging unit scavenges the fuel gas flow channel and then the oxidant gas flow channel if the fuel gas concentration detected by the fuel-gas-concentration detecting unit is the predetermined fuel gas concentration or lower.

In this system, the scavenging unit scavenges the oxidant gas flow channel and then the fuel gas flow channel if the fuel gas concentration detected by the fuel-gas-concentration detecting unit is higher than the predetermined fuel gas concentration. This avoids a situation where the fuel cell has the fuel gas remaining in the oxidant gas flow channel and the scavenge gas (such as air) remaining in the fuel gas flow channel. Accordingly, the electrodes of the fuel cell are not inverted in polarity (polarity inversion), and no negative voltage occurs therebetween, thus preventing degradation of the fuel cell.

The predetermined fuel gas concentration is set to a concentration at which it is determined that the electrodes of the fuel cell will be inverted in polarity (polarity inversion) because of the fuel gas remaining in the oxidant gas flow channel if the scavenging unit scavenges the fuel gas flow channel and then the oxidant gas flow channel.

Conversely, the scavenging unit scavenges the fuel gas flow channel and then the oxidant gas flow channel if the fuel gas concentration detected by the fuel-gas-concentration detecting unit is the predetermined fuel gas concentration or lower.

In another aspect, a fuel cell system includes a fuel cell that has a fuel gas flow channel and an oxidant gas flow channel and that generates electricity as a fuel gas is supplied to the fuel gas flow channel and an oxidant gas is supplied to the oxidant gas flow channel; a fuel gas supply channel through which the fuel gas flows toward the fuel gas flow channel; a fuel off-gas discharge channel through which a fuel off-gas discharged from the fuel gas flow channel flows; an oxidant gas supply channel through which the oxidant gas flows toward the oxidant gas flow channel; an oxidant off-gas discharge channel through which an oxidant off-gas discharged from the oxidant gas flow channel flows; a first shut valve disposed in the oxidant gas supply channel; a second shut valve disposed in the oxidant off-gas discharge channel; a shut valve control unit that controls the first shut valve and the second shut valve; a temperature-detecting unit that detects the temperature of the fuel cell; a scavenging unit that scavenges the fuel gas flow channel and the oxidant gas flow channel with a scavenge gas if the temperature of the fuel cell detected by the temperature-detecting unit is a predetermined temperature or lower after the fuel cell is shut down; a fuel-gas-concentration increasing unit that increases a fuel gas concentration in the oxidant gas flow channel; and an elapsed-time detecting unit that detects a time elapsed from the shut-down of the fuel cell. When the fuel cell is shut down, the fuel-gas-concentration increasing unit increases the fuel gas concentration in the oxidant gas flow channel, and the shut valve control unit closes the first shut valve and the second shut valve to seal off the oxidant gas flow channel. The scavenging unit scavenges the oxidant gas flow channel and then the fuel gas flow channel if the elapsed time detected by the elapsed-time detecting unit is within a second predetermined period of time during which it is determined that the fuel gas remains in the oxidant gas flow channel. The scavenging unit scavenges the fuel gas flow channel and then the oxidant gas flow channel if the elapsed time detected by the elapsed-time detecting unit is outside the second predetermined period of time.

In this system, because the shut valve control unit closes the first shut valve and the second shut valve to seal off the oxidant gas flow channel when the fuel cell is shut down (system shutdown), no outside air enters the oxidant gas flow channel, thus reducing OH radicals. This prevents degradation of the fuel cell.

Because the fuel-gas-concentration increasing unit increases the fuel gas concentration in the oxidant gas flow channel when the fuel cell is shut down, the fuel gas is not consumed by the reaction with the oxidant gas. Accordingly, the fuel gas remains in the fuel gas flow channel and the oxidant gas flow channel for a longer period of time. In addition, the fuel gas reduces oxidative degradation due to the oxidant gas.

Because the scavenging unit scavenges the fuel gas flow channel and the oxidant gas flow channel with a scavenge gas if the temperature of the fuel cell detected by the temperature-detecting unit is the predetermined temperature or lower after the fuel cell is shut down, the fuel cell can be prevented from freezing.

The scavenging unit scavenges the oxidant gas flow channel and then the fuel gas flow channel if the elapsed time detected by the elapsed-time detecting unit is within the second predetermined period of time, during which it is determined that the fuel gas remains in the oxidant gas flow channel. This avoids a situation where the fuel cell has the fuel gas remaining in the oxidant gas flow channel and the scavenge gas (such as air) remaining in the fuel gas flow channel. Accordingly, the electrodes of the fuel cell are not inverted in polarity (polarity inversion), and no negative voltage occurs therebetween, thus preventing degradation of the fuel cell.

Conversely, the scavenging unit scavenges the fuel gas flow channel and then the oxidant gas flow channel if the elapsed time detected by the elapsed-time detecting unit is outside the second predetermined period of time, during which it is determined that the fuel gas remains in the oxidant gas flow channel.

When the scavenging unit scavenges the fuel gas flow channel and then the oxidant gas flow channel, the rotational speed of the compressor decreases gradually, and accordingly its noise becomes gradually smaller, thus making the user feel less strange.

If the rotational speed of the compressor decreases gradually, the voltage applied to the compressor decreases gradually as well. This reduces the possibility of the voltage supplied to the compressor falling below the required operating voltage in the event of a voltage drop due to an IR drop.

In another aspect, a fuel cell system includes a fuel cell that has a fuel gas flow channel and an oxidant gas flow channel and that generates electricity as a fuel gas is supplied to the fuel gas flow channel and an oxidant gas is supplied to the oxidant gas flow channel; a fuel gas supply channel through which the fuel gas flows toward the fuel gas flow channel; a fuel off-gas discharge channel through which a fuel off-gas discharged from the fuel gas flow channel flows; an oxidant gas supply channel through which the oxidant gas flows toward the oxidant gas flow channel; an oxidant off-gas discharge channel through which an oxidant off-gas discharged from the oxidant gas flow channel flows; a first shut valve disposed in the oxidant gas supply channel; a second shut valve disposed in the oxidant off-gas discharge channel; a shut valve control unit that controls the first shut valve and the second shut valve; a temperature-detecting unit that detects the temperature of the fuel cell; a scavenging unit that scavenges the fuel gas flow channel and the oxidant gas flow channel with a scavenge gas if the temperature of the fuel cell detected by the temperature-detecting unit is a predetermined temperature or lower after the fuel cell is shut down; a fuel-gas-concentration increasing unit that increases a fuel gas concentration in the oxidant gas flow channel; and a fuel-gas-concentration detecting unit that detects the fuel gas concentration in the oxidant gas flow channel. When the fuel cell is shut down, the fuel-gas-concentration increasing unit increases the fuel gas concentration in the oxidant gas flow channel, and the shut valve control unit closes the first shut valve and the second shut valve to seal off the oxidant gas flow channel. The scavenging unit scavenges the oxidant gas flow channel and then the fuel gas flow channel if the fuel gas concentration detected by the fuel-gas-concentration detecting unit is higher than a predetermined fuel gas concentration. The scavenging unit scavenges the fuel gas flow channel and then the oxidant gas flow channel if the fuel gas concentration detected by the fuel-gas-concentration detecting unit is the predetermined fuel gas concentration or lower.

In this system, the scavenging unit scavenges the oxidant gas flow channel and then the fuel gas flow channel if the fuel gas concentration detected by the fuel-gas-concentration detecting unit is higher than the predetermined fuel gas concentration.

Conversely, the scavenging unit scavenges the fuel gas flow channel and then the oxidant gas flow channel if the fuel gas concentration detected by the fuel-gas-concentration detecting unit is the predetermined fuel gas concentration or lower.

Thus, a fuel cell system capable of effective scavenging while preventing degradation of a fuel cell is provided.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
   a fuel cell having a fuel gas flow channel and an oxidant gas flow channel, the fuel cell configured to generate electricity as a fuel gas is supplied to the fuel gas flow channel and an oxidant gas is supplied to the oxidant gas flow channel;
   a fuel gas supply channel through which the fuel gas flows toward the fuel gas flow channel;
   a fuel off-gas discharge channel through which a fuel off-gas discharged from the fuel gas flow channel flows;
   an oxidant gas supply channel through which the oxidant gas flows toward the oxidant gas flow channel;
   an oxidant off-gas discharge channel through which an oxidant off-gas discharged from the oxidant gas flow channel flows;
   a first shut valve disposed in the oxidant gas supply channel;
   a second shut valve disposed in the oxidant off-gas discharge channel;
   a shut valve controller configured to control the first shut valve and the second shut valve, the shut valve controller closing the first shut valve and the second shut valve to seal off the oxidant gas flow channel when the fuel cell is shut down;
   a temperature detector configured to detect a temperature of the fuel cell;
   a scavenging device configured to scavenge the fuel gas flow channel and the oxidant gas flow channel with a scavenge gas if the temperature of the fuel cell detected by the temperature detector is equal to or lower than a predetermined temperature after the fuel cell is shut down; and
   an elapsed-time detector configured to detect an elapsed time elapsed from a timing at which the fuel cell is shut down,
   wherein the scavenging device is configured to scavenge the oxidant gas flow channel and the fuel gas flow channel in sequence when the elapsed time detected by the elapsed-time detector is within a first predetermined period of time during which the fuel gas is to remain in the oxidant gas flow channel, and the scavenging device is configured to scavenge the fuel gas flow channel and the oxidant gas flow channel in sequence when the elapsed time detected by the elapsed-time detector is outside the first predetermined period of time.

2. The fuel cell system according to claim 1, further comprising:
   a contactor to electrically connect the fuel cell to an external circuit,
   wherein the elapsed-time detector is configured to detect the elapsed time elapsed from a timing at which the contactor is turned off.

3. A fuel cell system comprising:
   a fuel cell having a fuel gas flow channel and an oxidant gas flow channel, the fuel cell being to generate electricity as a fuel gas is supplied to the fuel gas flow channel and an oxidant gas is supplied to the oxidant gas flow channel;
   a fuel gas supply channel through which the fuel gas flows toward the fuel gas flow channel;
   a fuel off-gas discharge channel through which a fuel off-gas discharged from the fuel gas flow channel flows;
   an oxidant gas supply channel through which the oxidant gas flows toward the oxidant gas flow channel;
   an oxidant off-gas discharge channel through which an oxidant off-gas discharged from the oxidant gas flow channel flows;
   a first shut valve disposed in the oxidant gas supply channel;
   a second shut valve disposed in the oxidant off-gas discharge channel;
   a shut valve controller configured to control the first shut valve and the second shut valve, the shut valve controller closing the first shut valve and the second shut valve to seal off the oxidant gas flow channel when the fuel cell is shut down;
   a temperature detector configured to detect a temperature of the fuel cell;
   a scavenging device to scavenge the fuel gas flow channel and the oxidant gas flow channel with a scavenge gas if the temperature of the fuel cell detected by the temperature detector is equal to or lower than a predetermined temperature after the fuel cell is shut down; and
   a fuel-gas-concentration detector configured to detect a fuel gas concentration in the oxidant gas flow channel, the scavenging device scavenging the oxidant gas flow channel and the fuel gas flow channel in sequence if the fuel gas concentration detected by the fuel-gas-concentration detector is higher than a predetermined fuel gas concentration, the scavenging device scavenging the fuel gas flow channel and the oxidant gas flow channel in sequence if the fuel gas concentration detected by the fuel-gas-concentration detector is equal to or lower than the predetermined fuel gas concentration.

4. A fuel cell system comprising:
   a fuel cell having a fuel gas flow channel and an oxidant gas flow channel, the fuel cell being to generate electricity as a fuel gas is supplied to the fuel gas flow channel and an oxidant gas is supplied to the oxidant gas flow channel;
   a fuel gas supply channel through which the fuel gas flows toward the fuel gas flow channel;
   a fuel off-gas discharge channel through which a fuel off-gas discharged from the fuel gas flow channel flows;
   an oxidant gas supply channel through which the oxidant gas flows toward the oxidant gas flow channel;
   an oxidant off-gas discharge channel through which an oxidant off-gas discharged from the oxidant gas flow channel flows;
   a first shut valve disposed in the oxidant gas supply channel;
   a second shut valve disposed in the oxidant off-gas discharge channel;
   a shut valve controller configured to control the first shut valve and the second shut valve, the shut valve controller closing the first shut valve and the second shut valve to seal off the oxidant gas flow channel when the fuel cell is shut down;
   a temperature detector configured to detect a temperature of the fuel cell;
   a scavenging device to scavenge the fuel gas flow channel and the oxidant gas flow channel with a scavenge gas if the temperature of the fuel cell detected by the temperature detector is equal to or lower than a predetermined temperature after the fuel cell is shut down;

a fuel-gas-concentration increasing device to increase a fuel gas concentration in the oxidant gas flow channel, the fuel-gas-concentration increasing device increasing the fuel gas concentration in the oxidant gas flow channel when the fuel cell is shut down; and an elapsed-time detector configured to detect an elapsed time elapsed from a timing at which the fuel cell is shut down, the scavenging device scavenging the oxidant gas flow channel and the fuel gas flow channel in sequence if the elapsed time detected by the elapsed-time detector is within a second predetermined period of time during which the fuel gas is to remain in the oxidant gas flow channel, the scavenging device scavenging the fuel gas flow channel and the oxidant gas flow channel in sequence if the elapsed time detected by the elapsed-time detector is outside the second predetermined period of time.

5. The fuel cell system according to claim 4, further comprising:

a contactor to electrically connect the fuel cell to an external circuit, wherein the elapsed-time detector is configured to detect the elapsed time elapsed from a timing at which the contactor is turned off.

6. A fuel cell system comprising:

a fuel cell having a fuel gas flow channel and an oxidant gas flow channel, the fuel cell being to generate electricity as a fuel gas is supplied to the fuel gas flow channel and an oxidant gas is supplied to the oxidant gas flow channel;

a fuel gas supply channel through which the fuel gas flows toward the fuel gas flow channel;

a fuel off-gas discharge channel through which a fuel off-gas discharged from the fuel gas flow channel flows;

an oxidant gas supply channel through which the oxidant gas flows toward the oxidant gas flow channel;

an oxidant off-gas discharge channel through which an oxidant off-gas discharged from the oxidant gas flow channel flows;

a first shut valve disposed in the oxidant gas supply channel;

a second shut valve disposed in the oxidant off-gas discharge channel;

a shut valve controller configured to control the first shut valve and the second shut valve, the shut valve controller closing the first shut valve and the second shut valve to seal off the oxidant gas flow channel when the fuel cell is shut down;

a temperature detector configured to detect a temperature of the fuel cell;

a scavenging device to scavenge the fuel gas flow channel and the oxidant gas flow channel with a scavenge gas if the temperature of the fuel cell detected by the temperature detector is equal to or lower than a predetermined temperature after the fuel cell is shut down;

a fuel-gas-concentration increasing device to increase a fuel gas concentration in the oxidant gas flow channel, the fuel-gas-concentration increasing device increasing the fuel gas concentration in the oxidant gas flow channel when the fuel cell is shut down; and a fuel-gas-concentration detector configured to detect the fuel gas concentration in the oxidant gas flow channel, the scavenging device scavenging the oxidant gas flow channel and the fuel gas flow channel in sequence if the fuel gas concentration detected by the fuel-gas-concentration detector is higher than a predetermined fuel gas concentration, the scavenging device scavenging the fuel gas flow channel and the oxidant gas flow channel in sequence if the fuel gas concentration detected by the fuel-gas-concentration detector is equal to or lower than the predetermined fuel gas concentration.

7. A fuel cell system comprising:

a fuel cell having a fuel gas flow channel and an oxidant gas flow channel, the fuel cell configured to generate electricity as a fuel gas is supplied to the fuel gas flow channel and an oxidant gas is supplied to the oxidant gas flow channel;

a fuel gas supply channel through which the fuel gas flows toward the fuel gas flow channel;

a fuel off-gas discharge channel through which a fuel off-gas discharged from the fuel gas flow channel flows;

an oxidant gas supply channel through which the oxidant gas flows toward the oxidant gas flow channel;

an oxidant off-gas discharge channel through which an oxidant off-gas discharged from the oxidant gas flow channel flows;

a first shut valve disposed in the oxidant gas supply channel;

a second shut valve disposed in the oxidant off-gas discharge channel;

a temperature detector configured to detect a temperature of the fuel cell;

a scavenging device configured to scavenge the fuel gas flow channel and the oxidant gas flow channel with a scavenge gas if the temperature of the fuel cell detected by the temperature detector is equal to or lower than a predetermined temperature after the fuel cell is shut down; and a control unit programmed to:
control the first shut valve and the second shut valve, closing the first shut valve and the second shut valve to seal off the oxidant gas flow channel when the fuel cell is shut down, and
control the scavenging device to scavenge the oxidant gas flow channel and the fuel gas flow channel in sequence when the elapsed time detected by the elapsed-time detector is within a first predetermined period of time during which the fuel gas is to remain in the oxidant gas flow channel, and control the scavenging device to scavenge the fuel gas flow channel and the oxidant gas flow channel in sequence when the elapsed time detected by the elapsed-time detector is outside the first predetermined period of time.

8. The fuel cell system according to claim 7, further comprising:

a contactor to electrically connect the fuel cell to an external circuit, wherein the control unit is programmed to detect the elapsed time elapsed from a timing at which the contactor is turned off.

* * * * *